Nov. 17, 1942.                K. D. SMITH, JR                    2,302,353
                    VARIABLE SPEED CONTROL MECHANISM
                Filed March 24, 1941           6 Sheets-Sheet 1

INVENTOR.
                                            KIMBALL D. SMITH JR.
                          BY
                                              ATTORNEYS.

Nov. 17, 1942.    K. D. SMITH, JR    2,302,353
VARIABLE SPEED CONTROL MECHANISM
Filed March 24, 1941    6 Sheets-Sheet 5

INVENTOR.
KIMBALL D. SMITH JR.
BY
ATTORNEYS.

Patented Nov. 17, 1942

2,302,353

UNITED STATES PATENT OFFICE 2,302,353

VARIABLE SPEED CONTROL MECHANISM

Kimball D. Smith, Jr., Cleveland, Ohio, assignor to The Cleveland Automatic Machine Company, Cleveland, Ohio, a corporation of Ohio Application March 24, 1941, Serial No. 384,914

18 Claims. (Cl. 29—43)

This invention relates broadly to machine tools and more specifically to mechanism for controlling the rate of movement of one or more of the operative elements therein.

One of the machines in which the invention may be employed is an automatic screw machine where the improved control mechanism may be used to govern the rate of movement of the tool turret, the rate of movement of the tool cross slides, and the rate of rotation of the work holding spindle or each of them.

Another object of the invention is to provide a control mechanism which is designed to accommodate independent adjustment of the feed rate for each of the tools and effect the automatic sequential operation of the feed rates determined through such adjustments.

Another object of the invention is to provide an electrically operated control unit for actuating the regulating member of a variable speed power transmission mechanism, the control unit being provided with a plurality of adjustable contact points adapted respectively to govern each reciprocative movement of the turret within the operative cycle thereof.

Another object of the invention is to construct a control unit which may be readily coupled with a variable speed mechanism in any of the various machines embodying such a drive.

Further objects reside in the provision of a control unit which is susceptible of incremental adjustment, dependable of operation and economic of manufacture.

Other objects and advantages more or less ancillary to the foregoing and the manner in which all the various objects are realized will appear in the following description, which considered in connection with the acompanying drawings, sets forth the preferred embodiment of the invention.

Referring to the drawings, wherein the invention is illustrated as applied to an automatic screw machine.

Figure 1:
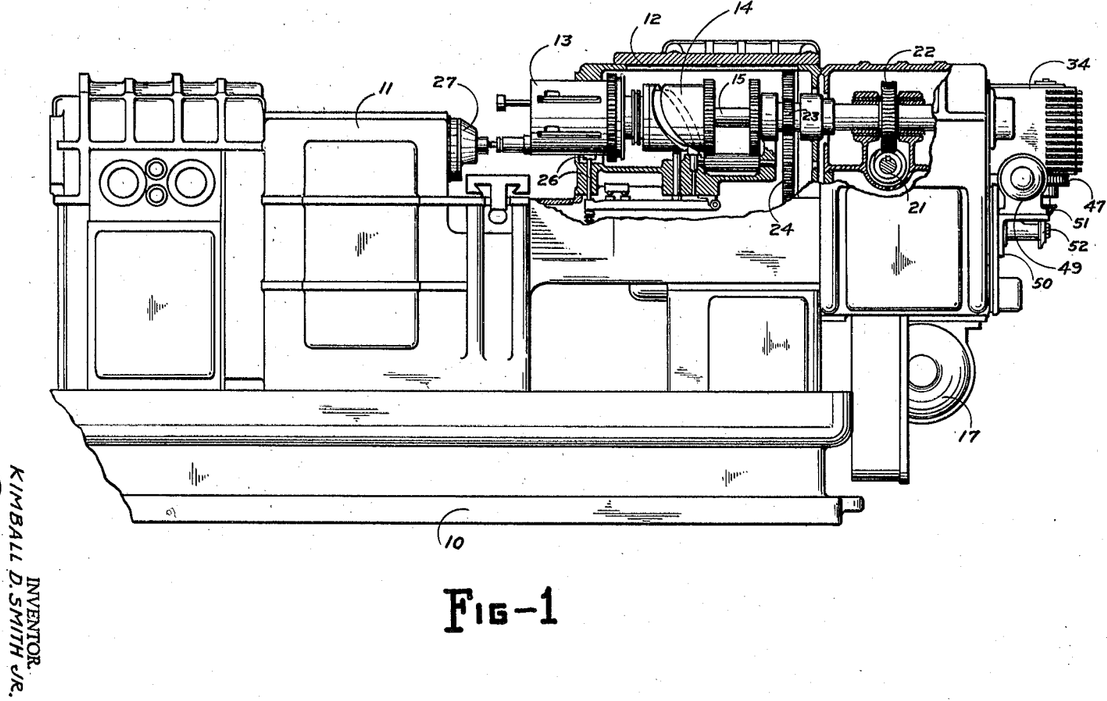
Fig. 1 is a front elevational view of an automatic screw machine embodying the improved control unit, a portion of the turret housing being broken away and shown in section.
Figure 6:
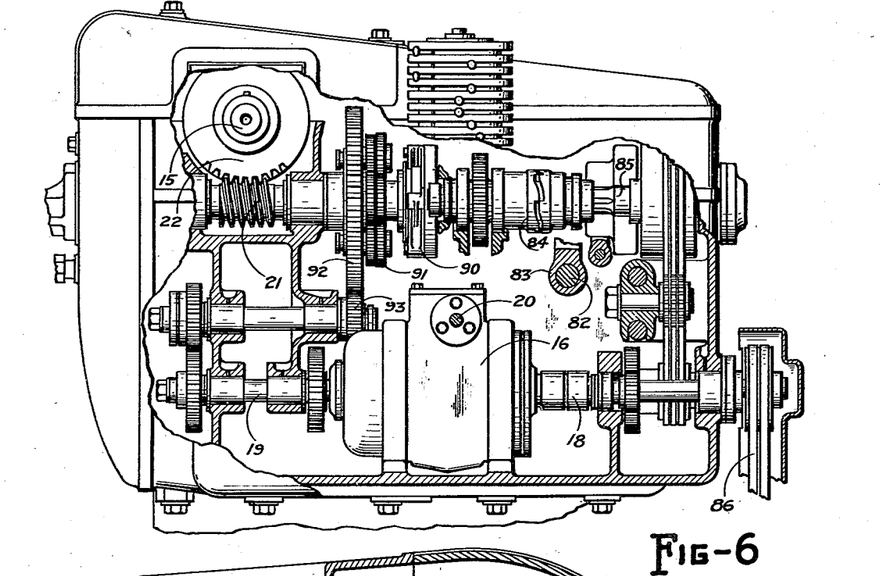
Fig. 6 is an end view of the machine shown partially in section illustrating the driving connections between the variable speed transmission mechanisms and the turret drive shaft.

Referring first to Fig. 1, the screw machine chosen herein for the purpose of illustrating the control unit and operative connections therefor comprises a base 10 having a spindle housing 11 and turret housing 12 mounted thereon. The tool turret 13 is rotatively advanced from station to station through an indexing mechanism, not shown, in the manner customarily employed in machines of this character. The reciprocative movement of the turret is obtained through a cam 14 mounted on a shaft 15 intergeared, as illustrated in Fig. 6, with a variable speed transmission mechanism 16 driven from a motor 17.

The variable speed transmission mechanism may be of any conventional form which, as shown, embodies power input shaft 18, intergeared with the motor 17, a power output shaft 19 and a rotative or oscillatory control rod 20. The power output shaft is coupled with the turret cam shaft 15 through a gear train illustrated in Fig. 6, which terminates with a worm 21 intermeshed with a worm wheel 22 mounted upon the shaft 15. As the control rod 20 is adjusted, say to a position where speed of the transmission mechanism 16 is relatively slow, the shaft 15 will effect a correspondingly slow rotative movement of the cam 14 and in turn a low feed rate of the tool in the turret then in action. Now if the control rod 20 is quickly reversed when the turret reaches the peak of the cam or another tool station the transmission mechanism 16 will deliver a relatively high rotative movement to the cam 14 and thus effect a rapid feed rate of the tool. As will be seen in Fig. 7, the turret shaft 15 is provided with a pinion 23 intermeshed with a gear 24 mounted upon a shaft 25. The gear ratio between the pinion 23 and the gear 24 is designed to produce as many revolutions of the pinion for each revolution of the gear as there are tool stations in the turret. Thus in a six tool station turret the pinion 23 will revolve six times during the period in which the gear 24 makes one complete revolution. The gear 24 is coordinated with an index mechanism, not shown, which advances the turret rotatively about its axis during the operative cycle of the machine. The indexing mechanism is intergeared with a key 26 (Fig. 1), which locks the turret in aligned relation with the work holding spindle 27 during the reciprocative movement of the turret. Since the index mechanism per se forms no part of the present invention, further description thereof is deemed unnecessary herein.

Figure 2:
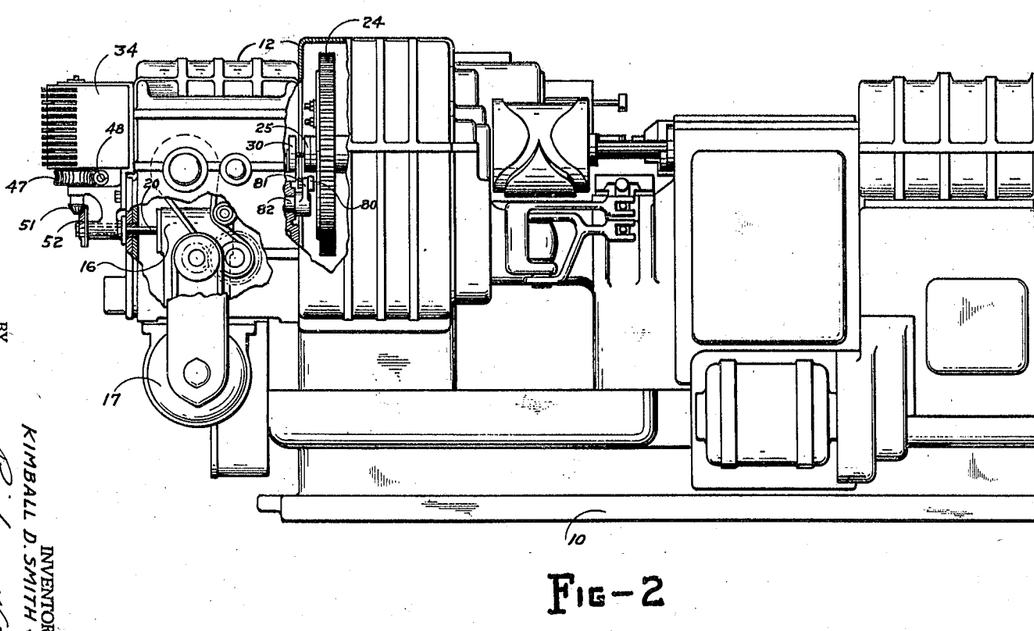
Fig. 2 is a rear elevational view of the machine shown in Fig. 1, certain portions of the turret housing being broken away and shown in section.
Figures 3, 4, 5:
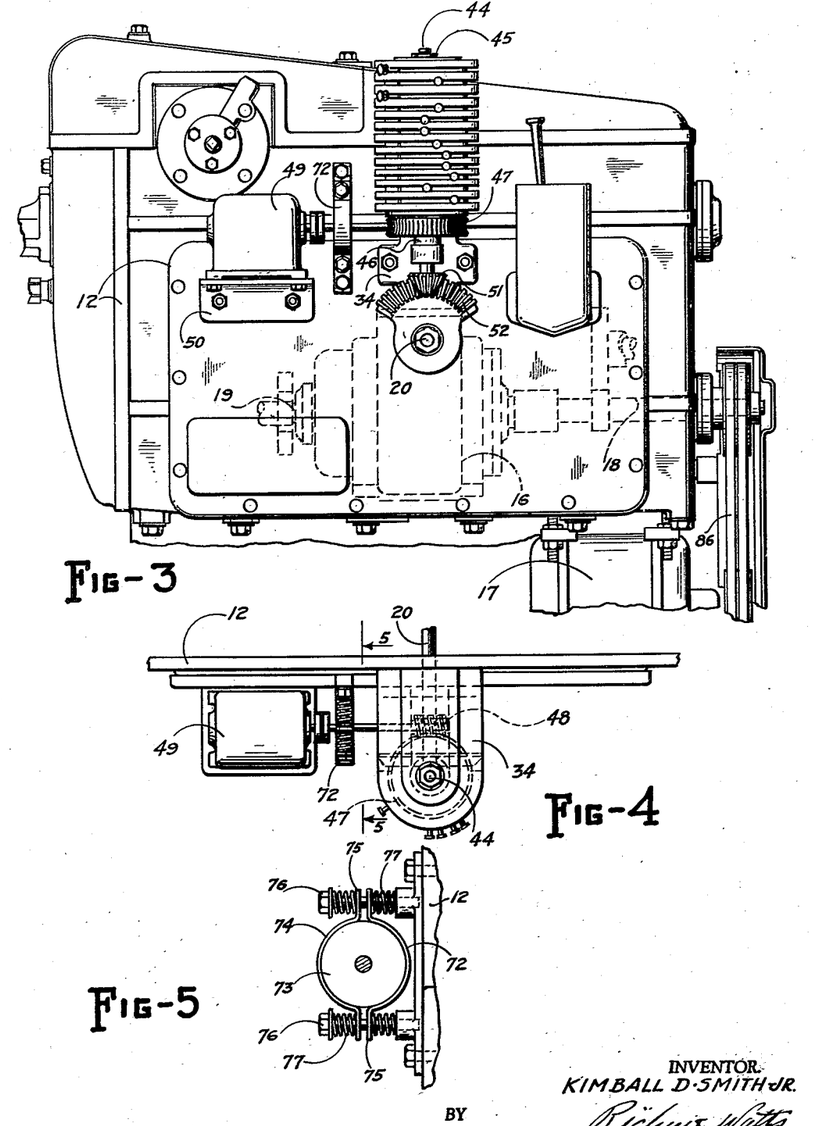
Fig. 3 is an end elevation of a fragmentary portion of the machine illustrated in Figs. 1 and 2, the chain guard then being broken away and shown in section.
Fig. 4 is a plan view of the control unit including the actuating motor and brake mechanism therefor.
Fig. 5 is a sectional view through the control unit drive shaft illustrating, in elevation, the electric motor brake.
Figure 7:
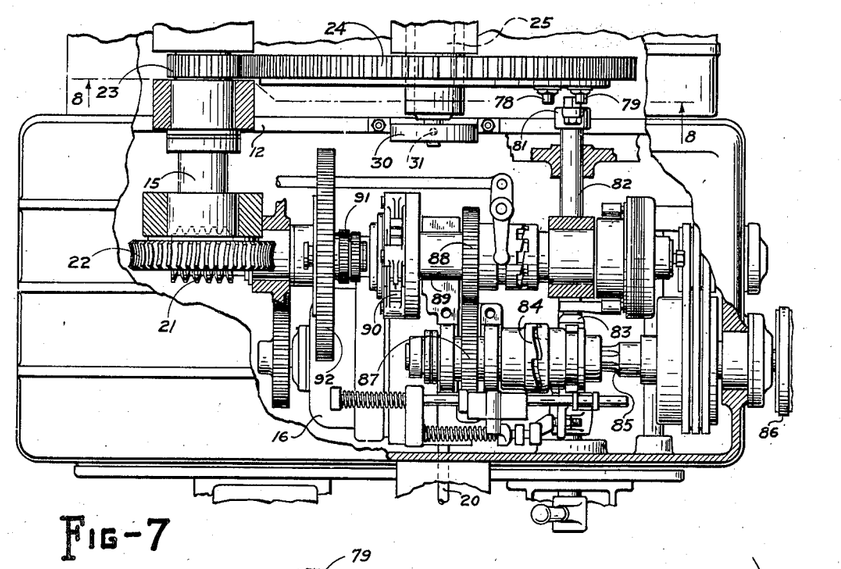
Fig. 7 is a plan view of a portion of the machine illustrated in Fig. 6, the housing and certain parts thereof being broken away and shown in section.
Figure 8:
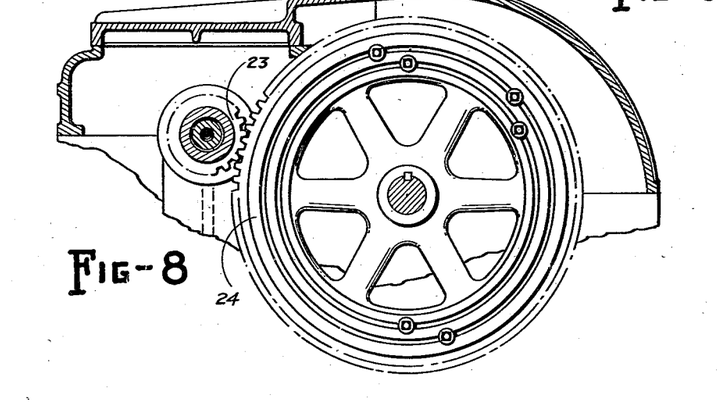
Fig. 8 is a vertical section through a portion of the gear housing, the section being taken on a plane indicated by the line 8—8 in Fig. 7.
Figures 11, 12, 13, 14, 15, 16, 17:
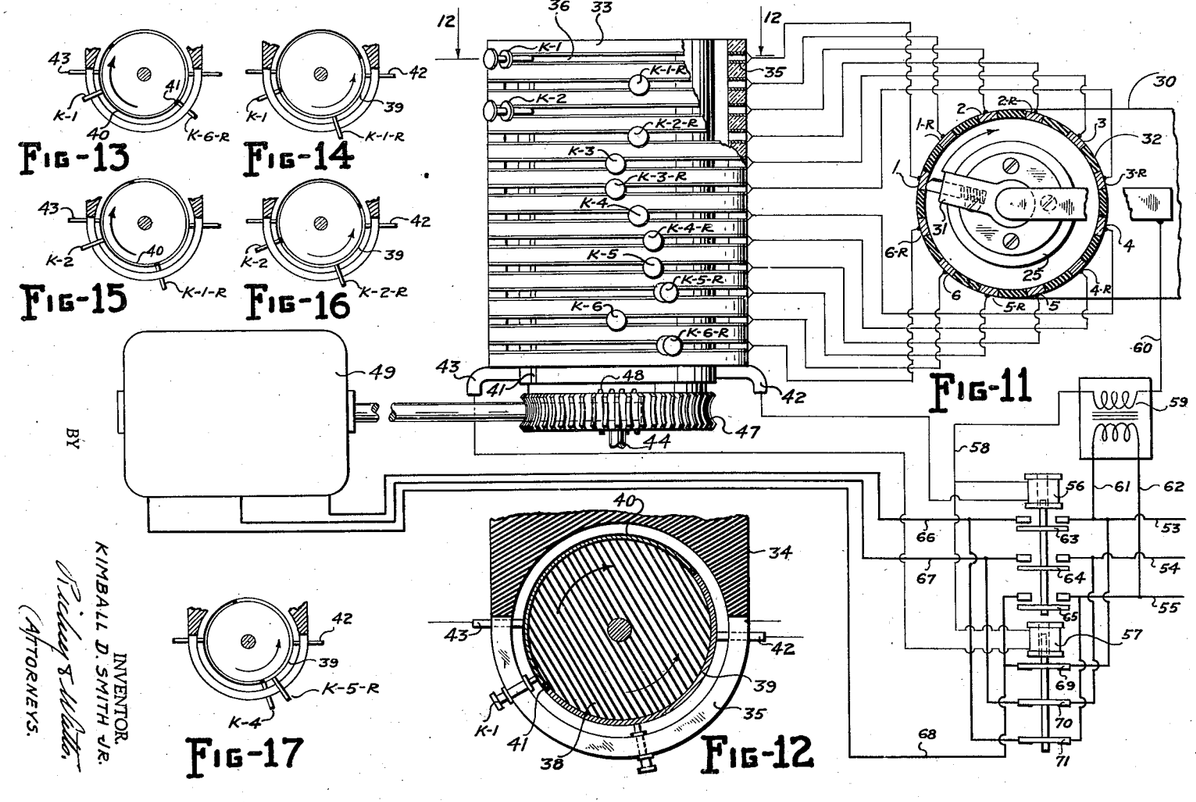
Fig. 11 is a diagrammatic view of the control unit including the motor and wiring diagram of the parts associated therewith.
Fig. 12 is a sectional view through the control unit, the section being taken on a plane indicated by the line 12—12 in Fig. 11.
Figs. 13, 14, 15, 16 and 17 are diagrammatic views of the control unit rotor showing the sequential order of operation of the rotor in relation to the contact knobs as arranged in Fig. 11.

Referring to Figs. 3, 7 and 11, the turret feed control mechanism comprises an electrical distributor 30 mounted upon the turret housing 12, adjacent the gear 24. The distributor comprises a brush 31, rotatively driven from the shaft 25, and a stationary laminated ring 32 embodying a plurality of contact segments arranged in spaced relation and insulated from each other. The number of contact segments corresponds to the number of separate translative movements of the turret within the operative cycle of the machine. Thus, as shown in the diagram (Fig. 11), a contact segment 1 is provided for the forward movement of the tool in the first station of the turret, a segment 1—R is provided for the return movement of the turret for such tool and correspondingly contact segments 2, 2—R, 3, 3—R, 4, 4—R, 5, 5—R, 6 and 6—R are provided for the remaining tool turret stations. The contact segments are wired to a selector switch 33 which comprises a base member 34 attached to the housing 12, and formed with an arcuate recess in the face thereof to accommodate the support of a rotor therein. Upon the forward portion of the base 34 there is a series of arcuate metallic bands 35 insulated from each other in pairs and disposed to provide slots 36. Within the slots there are contact knobs K slidably engageable with the bands 35 and with the periphery of the rotor or cylinder 38. The cylinder 38 is provided with a pair of metallic contact plates 39 and 40 extended throughout the length thereof and separated by longitudinal insulating strips 41 arranged in opposed diametric relation with each other (Fig. 12). The wires from the contact segments in the distributor are connected with the bands forming the successive slots 36 so that each knob in the selector switch will be electrically connected to corresponding contact segments in the distributor. The inner ends of the knobs may be formed as shown or with spring pressed brushes engageable with the contact plates 39 and 40 to assure the electrical connection between the knobs and the cylinder. The outer ends of the knobs are extended beyond the face of the strips 35 to facilitate the manipulation thereof during the adjustment of the control unit. The plates 39 and 40 are engaged by brushes 42 and 43 disposed, as shown in Fig. 12, in opposed diametric relation with each other. The cylinder 38 is mounted upon a shaft 44 journaled in bearings 45 and 46 (Fig. 3) formed in the base member 34. The lower end of the shaft 44 is provided with a worm wheel 47 engaged with a worm 48 keyed to the armature shaft of an electric motor 49 supported by a bracket 50 mounted on the housing 12. The shaft 44 is further provided with a beveled gear 51 engaged with a mutilated gear 52 keyed to the variable speed control shaft 29, (Figs. 2, 3 and 4). The three phase reversible motor 49 contemplated herein is operated by the current supplied through feed lines 53, 54 and 55. These lines are interrupted by a reversing switch operated through solenoids 56 and 57, the solenoid 56 being connected with the brush 42 and the solenoid 57 being connected with the brush 43. The circuit to the solenoids is completed through the wire 58 connected with a transformer 59 connected to the brush 31 through a wire 60. The transformer is connected to lines 53 and 55 through wires 61 and 62 respectively. The solenoid 56 is provided with plates 63, 64 and 65 adapted for engagement with contact points connected respectively with lines 53, 54 and 55, and with contact points connected with lines 66, 67 and 68 leading to the motor 49. The solenoid 57 is provided with plates 69, 70 and 71 adapted respectively for engagement with contact points connected with the lines 53, 54 and 55 and contact points connected with the lines 68, 67 and 66. As the brush 31 successively engages the segments 1, 1—R, 2, 2—R, etc. current is transmitted through the wires leading to the knobs K, through the knobs to either the contact plate 39 or 40 (depending upon the position in which the cylinder came to rest in the last operative movement of the motor) and through either the brush 42 and solenoid 56 or brush 43 and solenoid 57. When the solenoid 57 is energized the circuit between the lines 53, 54 and 55 and 68, 67 and 66, is closed and the motor 49 is rotated in a clockwise direction. When the solenoid 56 is energized the motor is rotated counterclockwise. As the armature of the motor is set in motion the worm 48 will effect the rotation of the cylinder 38 until the insulating strip 41 between the contact plates 39 and 40 is brought into contact with the knob in the circuit to the distributor. In this position the electric circuit to the motor is broken and the motor is stopped until the distributor closes the circuit to the next knob, the contact plate 39 or 40 and through the motor. In further detail and with reference to Figs. 11 and 12 when the distributor brush 31 engages the segment 1 which controls the outward movement of the turret for the first tool station therein, the current will flow through the bands 35, the knob K1, the plate 40, the brush 43 and the solenoid 57. Upon actuation thereof the line 53 will be connected with the line 68, the line 54 with the line 67 and the line 55 with the line 66, thus completing the circuit to the motor and causing the propulsion of the cylinder 38 in a clockwise direction, until the circuit is broken when the insulating strip 41 contacts the knob K1. Continued movement of the distributor brush 31 will cause the current to flow through the segment 1—R, which controls the return movement of the turret for the first tool stations therein, through the bands 35, knob K—1—R, the plate 39, brush 42 and the solenoid 56 which when energized will couple the line 53 with the line 66, the line 54 with the line 67 and the line 55 with the line 68, thus closing the circuit to the motor and causing the rotation thereof.

As the brush 31 successively engages the segments for the respective tool stations in the turret and closes the circuit to the motor, the armature and in turn the cylinder will be rotated until the circuit is broken by the insulating strips 41. In order to avoid a drift of the armature or an overrun of the insulating strips 41 relative to the knobs for the respective tool stations a spring pressed brake 72 may be provided, which, as shown in Fig. 5, comprises a disc 73 having a pair of bands 74 mounted upon the periphery thereof, the bands being formed with laterally extended ears 75 which are drilled for the support of studs 76 having compression springs 77 thereon, arranged to urge the bands into frictional engagement with the disc.

The operation of the cylinder and the relation of the knobs thereto is further illustrated in the diagrammatic views shown in Figs. 13 to 17. Considering first Fig. 13, the knob K—6—R is shown in contact with the insulating strip 41 where the cylinder came to rest when the electrical circuit was broken during the last step in the operative cycle of the turret. As indicated, the knob K—1 has been adjusted to a predetermined position which will effect the desired feed for the first tool in the turret. Thus when the brush 31 reaches the segment 1 the current will flow to the plate 40 through the line 43, the reversing switch and to the motor which will rotate the cylinder in the direction indicated by the arrow until the insulating strip 41 breaks the circuit and stops the motor. Rotation of the cylinder and in turn the gears 51 and 52 will cause the movement of the rod 20 in the direction and to the position which will produce the prerequisite R. P. M. of the variable speed transmission mechanism 16 and the consequent feed desired for the tool coordinated with knob K—1. As the brush 31 moves to the segment 1—R the circuit will be closed by the knob K—1—R which has been preadjusted to cause the beveled gear 51 and gear 52 to set the variable speed transmission mechanism 16 at the speed desired for the return movement of the turret. As will be seen by the diagram (Fig. 14) the knob K—1—R is now in engagement with the contact plate 39 which closes the circuit in the line 42, operates the reversing switch and causes the rotation of the motor and in turn the cylinder 38 in the opposite hand to that shown in Fig. 13. The knob K—2, having been set, as shown in Fig. 15, for the desired feed of the second tool, the current will now flow to the plate 40 through the brush 43, the reversing switch and to the motor, which will cause the rotation of the cylinder and the movement of the shaft 20 to the position which effects the desired R. P. M. of the transmission mechanism 16. Progressive engagement of the brush 31 with the contact segments will cause the rotation of the cylinder in the manner heretofore described and as further illustrated in Figs. 16 and 17, and thus effect adjustments of the variable transmission to produce translations of the turret at the rate of speed determined by the preselected positions of the various knobs.

Figure 9:
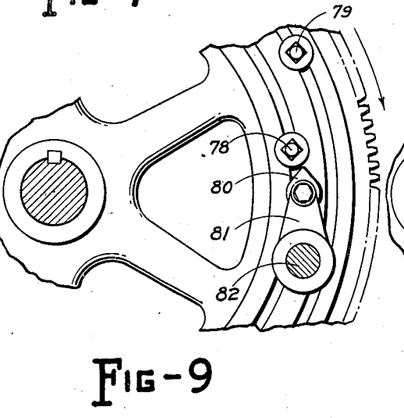
Fig. 9 is a fragmentary portion of a gear and clutch operating arm illustrated in Fig. 7.
Figure 10:
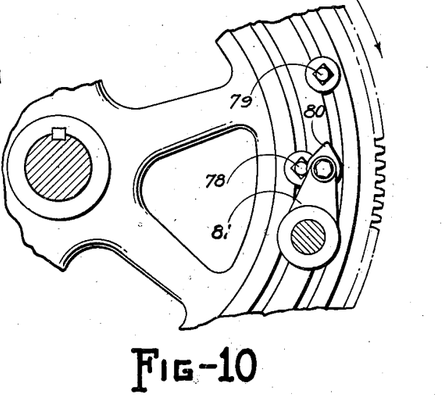
Fig. 10 is a similar elevational view of the portion of the gear shown in Fig. 9, the clutch operating arm being shown in an actuated position.

When the tools are relieved from operative engagement with the work it is desirable to provide a rapid traverse movement to the turret at a higher rate of speed than is obtainable through the variable speed transmission mechanism. To this end, pins or studs 78 and 79 may be placed within T-slots formed in the face of the gear 24 at such intervals as will effect the engagement of an independent high speed gear drive for such operation. As will be seen in Figs. 7, 9 and 10 the pins 78 and 79 are arranged for engagement with a trip finger 80 pivoted upon an arm 81 which is mounted on a rocker shaft 82 journaled in the housing 12. The shaft 82 is provided with a yoke 83 engaged with a clutch 84 which is mounted upon a shaft 85 driven from the motor 17 by a belt 86. The outer end of the shaft 85 is provided with a gear 87 entrained with a pinion 88 on the shaft 89 which is coupled with a ratchet 90 and differential gearing 91 coordinated with the gear 92 on the drive shaft for the worm 21.

Since the R. P. M. of the high speed gear shaft exceeds the output rate of the variable speed transmission mechanism, that is the R. P. M. of the shaft 19, the gearing 91 (Fig. 6) will overrun the gear 92 driven by the variable speed transmission mechanism 16 and the shaft 15 will then be driven through the high speed gearing train from the motor 17 until the cam finger 80 engages the pin 78 and rocks the arm 81 in the direction, which will disengage the clutch 84 and restore the drive from the variable speed transmission mechanism and the control unit therefor.

In summation of the operation of the control unit, the attendant first computes the feed rate for each of the tools in the turret and determines the retractive speed rate of the turret throughout the operative cycle thereof. He then adjusts each of the knobs in the selector switch to the position which will effect the desired predetermined rate of travel for each reciprocative movement of the turret. The position of the knobs for the various feed rates may be determined by a calibrated plate (not shown) secured upon the portion of the control unit body which is formed by the bands 35. With the knobs so adjusted the distributor 30 sequentially closes the circuit to the electric motor 49 causing the movement of the beveled gear 51, the adjustment of the variable speed transmission and the rotation of the cylinder to the point where the insulating strip breaks the circuit.

Although the foregoing description is directed to the operation of the control unit as coordinated with the turret in a screw machine, it is to be understood that the device may be organized to control the movement of the cross slide tools and/or speed of the spindle. It is further to be understood that the control unit may be used in other machine tools, hence the specific terminology employed herein is not intended to be restrictive or confining, since various rearrangements of parts and modifications of detail may be resorted to without departing from the scope or spirit of the invention as herein claimed.

I claim:

1. In a machine tool embodying a driven member, mechanism for controlling the rate of movement thereof, comprising, a variable speed transmission, a shaft driven thereby and operatively connected with said driven member, a second shaft intergeared therewith, an electrical distributor thereon, a selector switch connected therewith, a motor connected with said switch and said distributor, a movable part in said switch actuated by said motor and means on said part coupled with said variable speed transmission for controlling the output speed thereof.

2. In a screw machine embodying a reciprocable tool turret, mechanism for controlling the rate of translation thereof comprising, a variable speed transmission, a control rod therefor, a cam shaft driven from said transmission, driving connections thereon for reciprocating the turret, a second shaft intergeared with said cam shaft for indexing the turret, an electrical distributor thereon, a selector switch connected therewith, a motor operatively connected with said switch and said distributor, a movable member in said switch actuated by said motor, and means thereon for actuating said variable speed transmission control rod.

3. In a screw machine embodying an indexible, reciprocable turret having a plurality of tools therein, mechanism for regulating the feed and return rate of said turret, comprising, a variable speed transmission, a control arm therefor, a cam for reciprocating the turret intergeared with said transmission, an index shaft intergeared with said cam, an electrical distributor thereon, contact segments therein, the number of contact segments corresponding to the number of tools in the turret and the number of return movements of the turret in the operative cycle thereof, a selector switch connected with said distributor, adjustable contact knobs thereon connected respectively with said segments, a rotatable cylinder in said switch, a motor connected with said distributor and said switch and intergeared with said cylinder, gearing intermediate said cylinder and said variable speed transmission control arm, and means on said cylinder for making and breaking the electric circuit between said distributor and said motor.

4. In a screw machine embodying a reciprocative tool slide, mechanism for regulating the feed rate thereof comprising, a variable speed transmission gearing operatively connected with the slide, an electrical distributor driven from said gearing, a selector switch connected to said distributor, a reversible motor connected with said selector switch and said distributor, a reversing switch connected with said distributor, selector switch and motor, a movable member in said switch actuated by said motor, means on said movable member for controlling said variable speed transmission and means in said movable member for operating said reversing switch.

5. A control unit for regulating the rate of movement of a reciprocating member in a machine tool comprising, a variable speed transmission intergeared with the reciprocating member, an electric distributor intergeared with the reciprocating member, a selector switch connected to said distributor, a motor connected to said switch and said distributor, a rotor in said switch driven by said motor, gearing on said rotor coupled with said variable speed transmission and constituting the regulating medium therefor and means in said selector switch for preselecting sequential movements of said rotor.

6. In a screw machine embodying a reciprocating, indexible turret having a plurality of tools therein, a control unit for regulating the rate of translation of the turret comprising, a variable speed transmission, a control arm therefor, an electric selector switch, adjustable contact knobs therein for each of the respective movements of the turret in the index cycle thereof, a rotor in said switch intergeared with said transmission control arm, a distributor driven from said transmission, contact segments in said distributor connected respectively with said contact knobs in said selector switch, a motor electrically connected with said switch and intergeared with said rotor and means on said rotor for closing the electric circuit between said distributor and said motor.

7. In an automatic screw machine embodying a reciprocative tool holder, an electrically operated control unit for regulating the feed rate thereof comprising, a variable speed transmission, a control rod therefor, an electrical selector switch, a rotatable cylinder therein, driving connections between said cylinder and said transmission control rod, a motor, driving connections between said motor and said cylinder, adjustable electrical contacts in said selector switch, electrical connections between said contacts and said motor, an electric distributor driven from said transmission, electrical connections between said distributor and said contacts in said switch and means in said distributor for sequentially closing the circuits between the motor and said adjustable contacts.

8. In a screw machine having a reciprocative, indexible tool turret, mechanism for controlling the feed rate thereof comprising, a variable speed transmission, a control rod therefor, driving connections intermediate the turret and said transmission, an electrical distributor driven from said driving connections, a contact segment in said distributor for each reciprocative movement of the turret in the index cycle thereof, a selector switch, an adjustable contact knob in said switch for each reciprocative movement of the turret in the index cycle thereof, electrical connections between said contact knobs and segments, a rotative cylinder in said switch, driving connections between said cylinder and said transmission control rod, a reversible motor, driving connections between said motor and said cylinder, a pair of solenoids, a switch mounted on one of said solenoids for closing the circuit to rotate the motor in one direction, a switch mounted on the other solenoid for closing the circuit to rotate the motor in the opposite direction and a pair of contact plates on said cylinder connected respectively with said solenoids and engageable with said contact knobs.

9. In a screw machine embodying an indexible, reciprocable turret having a plurality of tools therein, mechanism for regulating the feed and return rate of said turret, comprising, a variable speed transmission, a control arm therefor, a cam for reciprocating the turret intergeared with said transmission, an index shaft intergeared with said cam, an electrical distributor thereon, contact segments therein, the number of contact segments corresponding to the number of tools in the turret and the number of return movements of the turret in the operative cycle thereof, a selector switch connected with said distributor, adjustable contact knobs thereon connected respectively with said segments, a rotatable cylinder in said switch, a motor connected with said distributor and said switch and intergeared with said cylinder, gearing intermediate said cylinder and said variable speed transmission control arm, means on said cylinder for making and breaking the electric circuit between said distributor and said motor, an overriding gear coupled with said cam, a clutch coupled therewith and means for operating said clutch.

10. In a screw machine embodying a reciprocable, indexible turret having a plurality of tools therein, mechanism for controlling the reciprocative rate of movement thereof comprising, a variable speed transmission, a control rod therefor, an electric selector switch, adjustable contact knobs therein for each reciprocative movement of the turret within the index cycle thereof, a cylinder in said switch, a pair of contact plates thereon engageable with said contact knobs, insulating strips intermediate said contact plates, a reversible motor electrically connected to said selector switch, driving connections between said motor and said cylinder, driving connections between said cylinder and said transmission control rod, a reversing switch for said motor, electrical connections from said contact plates to said reversing switch, an electrical distributor, a brush therein rotatively driven from said transmission, a contact segment in said distributor for each reciprocative movement of the turret within the index cycle thereof, electrical connections between said contact segments and said contact knobs, said brush closing the circuits from the segments to the motor and said insulating strips breaking the circuits to said motor.

11. In a screw machine having a tool slide, mechanism for controlling the feed thereof comprising, a variable speed transmission, a control rod therefor, a selector switch, a rotative cylinder in said switch, a pair of contact plates on said cylinder disposed in spaced relation and insulated from each other, a plurality of adjustable contact knobs engaged with said plates, a pair of brushes in said switch disposed in staggered, diametric relation with each other and arranged with each brush engaged with one of said plates, a reversing switch electrically connected to said brushes, a reversible motor, driving connections between said motor and said cylinder, driving connections between said cylinder and said transmission control rod, electrical connections between said reversing switch and said motor, a distributor, a plurality of contact segments therein, electrical connection from said segments to said contact knobs, said contact knobs being disposed on one side of said cylinder intermediate said brushes whereby the circuit from the distributor to the motor may be closed by said contact knobs, one of said plates and one of said brushes.

12. In a screw machine embodying a reciprocable turret, mechanism for controlling the reciprocative rate of movement thereof, comprising, a variable speed transmission, a regulator rod therefor, driving connections between said variable speed transmission and the turret, a control unit for actuating said regulator rod, a rotatable member in said control unit intergeared with said rod, a motor for actuating said rotatable member, adjustable means in said control unit for making and breaking an electric circuit to said motor for restricting the movement of said rotatable member and an electrical distributor driven from said variable speed transmission for actuating said adjustable means for restricting the movement of the rotatable member.

13. In a screw machine embodying a reciprocative tool turret having a variable speed transmission mechanism coupled therewith, an electrical control unit therefor, comprising, an electrical distributor driven from said transmission, a plurality of contacts therein, an electrical selector switch, a plurality of adjustable contacts therein, a rotor in said switch, electric conductors on said rotor engaged with said adjustable contacts, a reversible motor intergeared with said rotor, a reversing switch therefor, electrical connections between said contacts in said distributor and said contacts in said selector switch, electrical connections between said selector switch, and said reversing switch, electrical connections between said reversing switch and said motor, a control member associated with said variable speed transmission and gearing intermediate said control member and said rotor.

14. A control mechanism for regulating the feed of a turret in an automatic screw machine, comprising a variable speed transmission, a regulator rod therefor, driving connections between said variable speed transmission and said turret, an electrical distributor, a rotor therein driven from said variable speed transmission, a plurality of contact segments in said distributor, engageable with said rotor, an electrical selector switch, a plurality of adjustable contact knobs therein connected respectively with said segments in said distributor, a rotatable cylinder in said selector switch, a pair of conductor plates thereon disposed through the length thereof and arranged in spaced relation with each other, insulating strips separating said conductor plates, said adjustable contact knobs being engageable with said conductor plates, a reversible motor intergeared with said cylinder, a reversing switch connected with said contact plates and with said motor, said switch and one of said plates effecting the rotation of the motor in one direction, said switch and the other of said plates effecting the rotation of the motor in the opposite direction, gearing intermediate said motor and said transmission regulating rod, said regulating rod being actuated in the direction determined by the closure of the circuit through the rotor, the contact knob and the contact plate engaged therewith.

15. A control mechanism for regulating the feed of a turret in an automatic screw machine, comprising a variable speed transmission, a regulator rod therefor, driving connections between said variable speed transmission and said turret, an electrical distributor, a rotor therein driven from said variable speed transmission, a plurality of contact segments in said distributor, engageable with said rotor, an electrical selector switch, a plurality of adjustable contact knobs therein connected respectively with said segments in said distributor, a rotatable cylinder in said selector switch, a pair of conductor plates thereon disposed through the length thereof and arranged in spaced relation with each other, insulating strips separating said conductor plates, said adjustable contact knobs being engageable with said conductor plates, and movable about the periphery of said cylinder, a reversible motor intergeared with said cylinder, a reversing switch connected with said contact plates and with said motor, said switch and one of said plates effecting the rotation of the motor in one direction, said switch and the other of said plates effecting the rotation of the motor in the opposite direction, gearing intermediate said motor and said transmission regulating rod, said regulating rod being actuated by rotation of the cylinder as the circuit is closed successively by said rotor, contact knob and plate and said regulating rod being held in a stationary position when 16. In a screw machine embodying a reciprocable tool turret, mechanism for controlling the rate of translation thereof comprising, a variable speed transmission, a control rod therefor, a cam shaft driven from said transmission driving connections thereon for reciprocating the turret, a second shaft intergeared with said cam shaft for indexing the turret, an electrical distributor thereon, a selector switch connected therewith, a motor operatively connected with said switch and said distributor, a movable member in said switch actuated by said motor, means thereon for actuating said transmission control rod, an overriding gear entrained with the driving connections for the turret, a clutch coupled therewith and means for operating said clutch.

17. In a screw machine embodying a reciprocable tool turret, mechanism for controlling the rate of translation thereof comprising, a variable speed transmission, a control rod therefor, a cam shaft driven from said transmission driving connections thereon for reciprocating the turret, a second shaft intergeared with said cam shaft for indexing the turret, an electrical distributor thereon, a selector switch connected therewith, a motor operatively connected with said switch and said distributor, a movable member in said switch actuated by said motor, means thereon for actuating said transmission control rod, an overriding gear entrained with the driving connections for the turret, a clutch coupled therewith, a gear on said second shaft, adjustable pins thereon and an arm engageable with said pins for operating said clutch.

18. In a machine tool embodying a driven member, mechanism for controlling the rate of movement thereof, comprising a variable speed driving unit, a regulator rod therefor, driving connections between said variable speed driving unit and said driven member, a control mechanism intergeared with said regulator rod, a motor connected to and coordinated with said control mechanism, adjustable means in said control mechanism for making and breaking an electric circuit to said motor for actuating said rod and a timing device for regulating the order of operation of said adjustable means.

KIMBALL D. SMITH, Jr.